Figure 1:
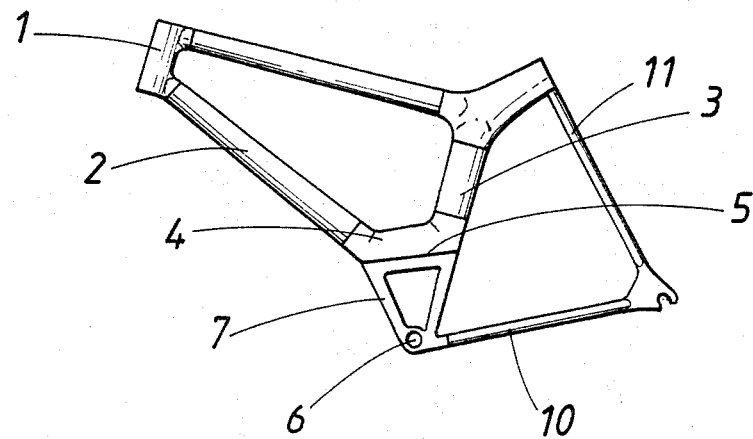

United States Patent [19]

Spekner

[11] Patent Number: 4,529,216
[45] Date of Patent: Jul. 16, 1985

[54] TWO-WHEELED VEHICLE

[75] Inventor: Fritz Spekner, Graz, Austria

[73] Assignee: Steyr-Daimler-Puch Aktiengesellschaft, Vienna, Austria

[21] Appl. No.: 526,393

[22] Filed: Aug. 25, 1983

[30] Foreign Application Priority Data

Sep. 8, 1982 [AT] Austria ................................ 3351/82

[51] Int. Cl.³ .............................................. B62K 3/02
[52] U.S. Cl. ............................................... 280/281 R
[58] Field of Search .......... 280/281 R, 281 LP, 281 B

[56] References Cited

U.S. PATENT DOCUMENTS 500,177  6/1893  Winton ............................... 280/281

FOREIGN PATENT DOCUMENTS 880712   6/1953  Fed. Rep. of Germany .
907260   3/1954  Fed. Rep. of Germany .
1034999  7/1958  Fed. Rep. of Germany .
1961989  6/1970  Fed. Rep. of Germany .
118453   8/1918  United Kingdom ............ 280/281 R
517604   2/1940  United Kingdom .

Primary Examiner—Richard A. Bertsch
Attorney, Agent, or Firm—Kurt Kelman

[57] ABSTRACT

The two-wheeled vehicle comprises a frame having a steering head, a first frame member connected to and downwardly inclined from the steering head, and a second frame member which forms a junction with the lower end of the first frame member and extends upwardly from the junction. The frame has a downwardly facing seating surface at the junction. A structural unit is connected to the frame at the seating surface and comprises a rear fork. The seating surface extends only across the width of the frame at said junction. The frame is formed with blind bores in the seating surface. The structural unit is connected to the frame by screws and locating pins extending from below into the blind bores.

5 Claims, 6 Drawing Figures

TWO-WHEELED VEHICLE

This invention relates to a two-wheeled vehicle comprising a frame including a frame member, which is downwardly inclined from the steering head, and another frame member which adjoins the lower end of the first-mentioned frame member and accommodates the seat pillar, wherein a housing which together with a rear fork constitutes a rigid structural unit is secured to the junction of the two frame members. The unit accommodates a bottom bracket bearing and is detachable from below.

In a known bicycle (German Patent Specification No. 19 61 989), the two frame members are combined to form a tube which is bent approximately in V or U shape. Two bushings which extend transversely to the axis of the tube are welded to the tube at its apex and accommodate screws for fixing the housing. The vehicle is so designed that it can be taken apart but that design does not permit the use of one and the same frame in two-wheeled vehicles of different types. In a known cast bicycle frame made of light metal (German Pat. No. 907,260), the lower core opening is closed by a screw-connected motor-transmission block. In that arrangement the frame originally intended for a bicycle is used as a motorcycle frame but the bicycle frame is changed for use as a motorcycle frame so that one and the same frame cannot readily be used selectively in a bicycle or in a motorcycle.

It is an object of the invention so to improve such a two-wheeled vehicle that the same frame can be used without any alteration for a bicycle having a rigid rear fork, a bicycle having a spring-cushioned rear swinging fork or, motor-assisted bicycle or a motorcycle having a rear swinging fork frame.

This object is accomplished in accordance with the invention in that the frame has at the junction of the two frame members a downwardly facing seating surface, the housing is adapted to be connected to the seating surface directly or with interposition of a baseplate provided with a hinge bearing for the housing and an abutment for a cushioning spring, and the housing optionally constitutes a carrying part of a closed chaincase and/or constitutes a motor and transmission housing.

If the housing, which together with the rear fork constitutes a rigid structure unit of construction, which accommodates also the bottom bracket bearing, is secured directly to the seating surface, then a conventional bicycle will be obtained in which the rear wheel is not spring-cushioned. In that case, the rear fork may be braced against the frame by inclined stays. The top end portions of the stays may be accommodated in blind holes in the frame so that additional measures are not required and the unit can be mounted without difficulty. If a two-wheeled vehicle having a rear swinging fork is to be manufactured, it will be sufficient to secure the baseplate to the seating surface. In that case, the baseplate comprises not only a hinge bearing for the housing, which is combined with the rear swinging fork, but is also provided with the abutment for the cushioning spring, which is interposed between the housing and the baseplate so that the desired spring-cushioned rear swinging fork is provided without a need for an alteration of the frame or for a provision of spring abutments. The backing spring may consist of a rubber spring or a multiple disc spring. The latter will afford the advantage that the spring force can be influenced by a change of the number of individual disc springs. Depending on whether or not the housing is supplemented to form a closed chaincase, a sports vehicle which is particularly light in weight or a comfortable touring vehicle will be obtained. The same frame without an alteration can also be used in a motorcycle or in a motor-assisted bicycle if the housing consists of a motor and transmission housing. In that case, a rear swinging fork will preferably be provided in combination with the baseplate.

To prevent a soiling of the hinge bearing for the housing and of the backing spring and to improve the appearance, the space between the housing and the seating surface is desirably covered by a bellows when the baseplate is provided.

Figure 2:
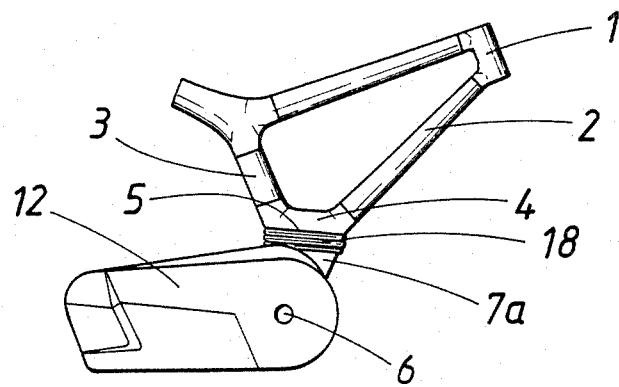
Figure 3:
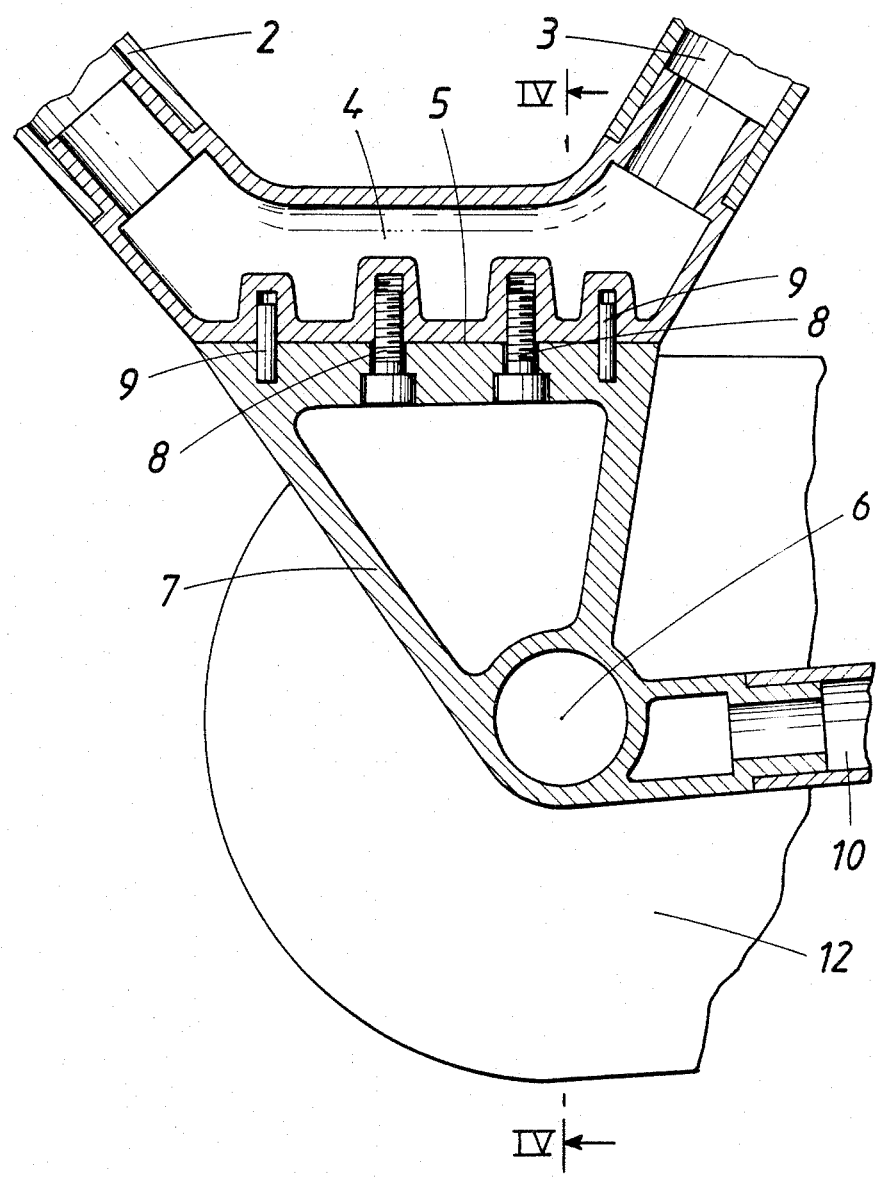
Figure 4:
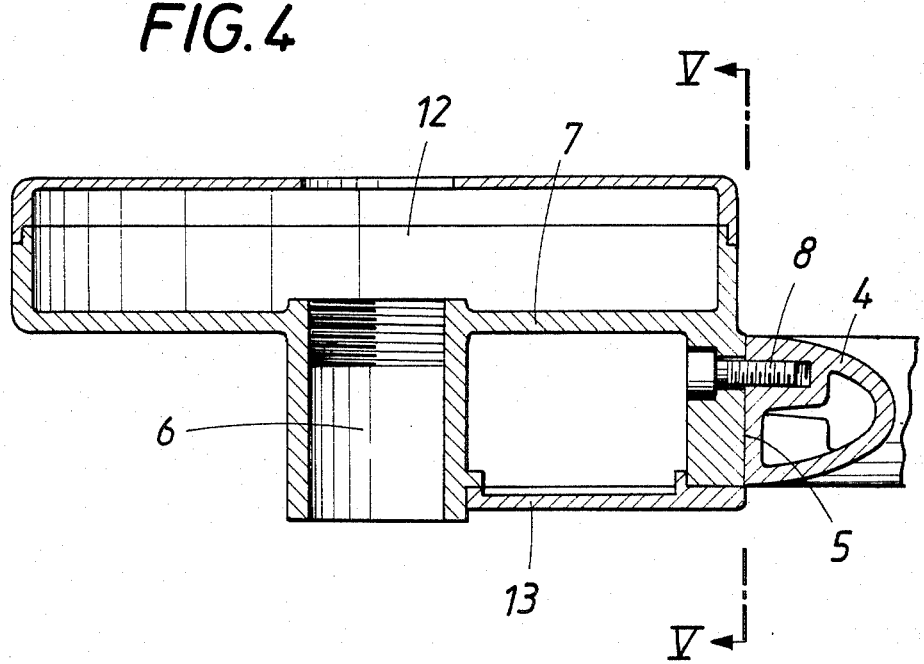
Figure 5:
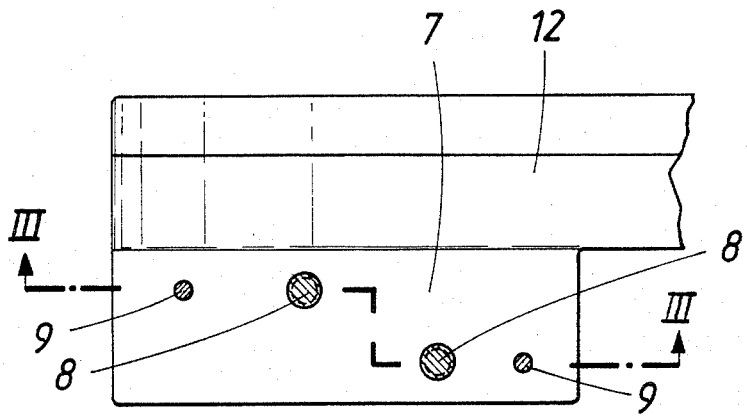
Figure 6:
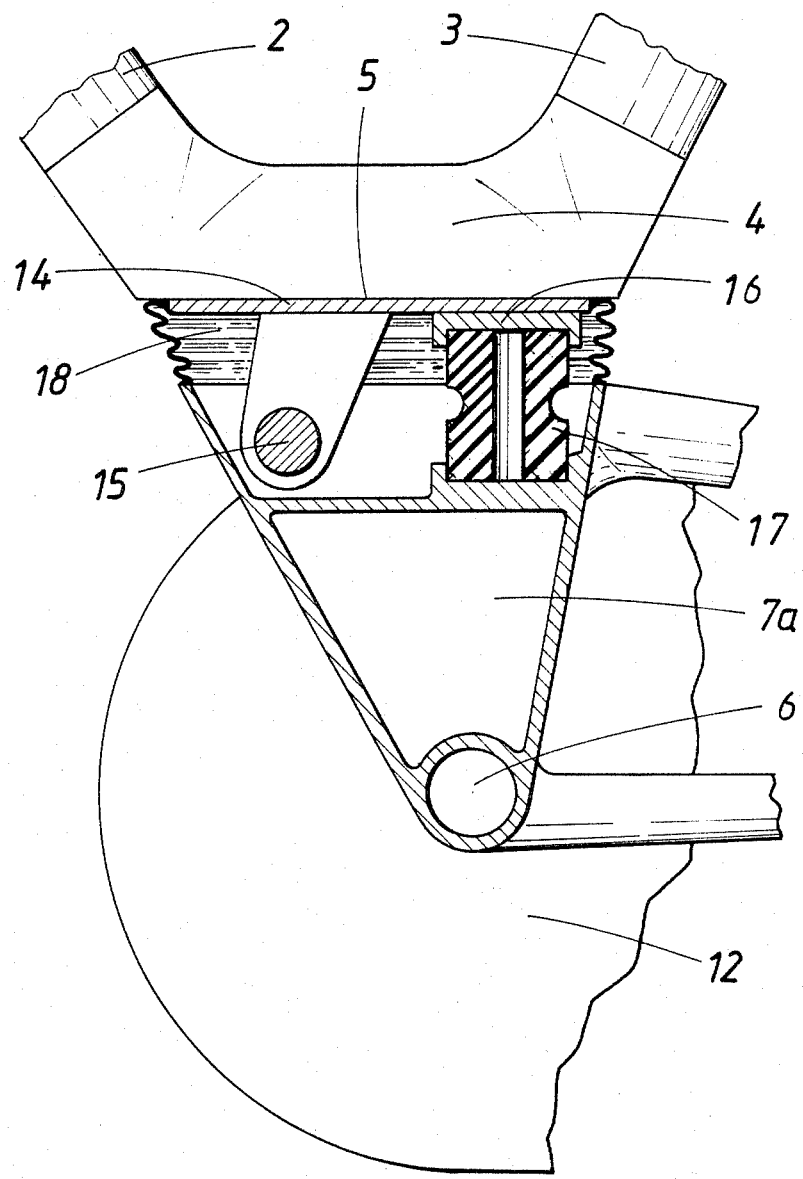

The subject matter of the invention is shown by way of example on the drawing, in which FIG. 1 is a side elevation showing the frame of a bicycle having a rigid rear fork, FIG. 2 is an elevation viewed from the other side showing the same frame used in combination with a rear swinging fork, FIG. 3 is an enlarged vertical sectional view taken on line III—III in FIG. 5 and shows the fixation of a rigid rear fork to the frame of the vehicle, FIG. 4 is a corresponding transverse sectional view on a line IV—IV in FIG. 3 adjacent to the axis of the bottom bracket bearing, FIG. 5 is a sectional view taken along the seating surface on line V—V of FIG. 4 and FIG. 6 is a view which is similar to FIG. 3 and shows the mounting of a rear swinging fork.

The two-wheeled vehicle according to the invention comprises a frame, which includes a first frame member 2 that is downwardly inclined from the steering head 1 and an upwardly extending second frame member 3, which adjoins the lower end of the first frame member 2 and accommodates the seat pillar, not shown. The portion of the frame adjacent to the junction of the two frame members 2, 3 has on its underside a seating surface 5. The frame defines blind bores in the seating surface. In accordance with FIGS. 1 and 3 to 5, a housing 7 which accommodates a bottom bracket bearing 6 is secured with screws 8 pins directly to the seating surface 5 and locating pins extend from below into the blind bores in the seating surface, as shown in FIG. 3. That housing 7 and the rear fork 10 constitute a rigid structural unit. The rear fork 10 is braced against the vehicle frame at its top by inclined stays 11, which are simply fitted into blind openings of the frame.

In accordance with FIGS. 4 and 5, the housing 7 constitutes the carrying part of a closed chaincase 12 and the space between the bottom bracket bearing 6 and the housing wall which adjoins the seating surface 5 is closed by a side cover 13.

FIGS. 2 and 6 show a modification in which a baseplate 14 is secured to the seating surface 5 and is provided with a hinge bearing 15 for the housing 7a and with an abutment 16 for a cushioning rubber spring 17. The housing 7a constitutes also the carrying part of the closed chaincase 12. The space between the housing 7a and the seating surface 5 is covered by a bellows 18.

In a motor-assisted bicycle, the rear swinging fork consisting of the housing 7a and the chaincase 12 might constitute a motor-transmission housing.

What is claimed is:

1. A two-wheeled vehicle comprising
  (a) a frame having (1) a steering head,
(2) a first frame member connected to, and downwardly inclined from, said steering head,
(3) a second frame member forming a junction with a lower end of said first frame member and extending upwardly from said junction, and
(4) a downwardly facing seating surface at said junction, the seating surface extending across, and not exceeding, the width of said frame at said junction, and the frame defining blind bores in the seating surface, (b) a structural unit comprising a rear fork and adjoining said seating surface, the unit having
(1) locating pins, and (c) screws connecting the structural unit to said frame at said seating surface, the locating pins extending from below into the blind bores in the seating surface.

2. The two-wheeled vehicle of claim 1, wherein the structural unit further comprises a bottom bracket bearing.

3. The two-wheeled vehicle of claim 1, further comprising a closed chaincase carried by said structural unit.

4. A two-wheeled vehicle comprising
(a) a frame having
(1) a steering head,
(2) a first frame member connected to, and downwardly inclined from, said steering head,
(3) a second frame member forming a junction with a lower end of said first frame member and extending upwardly from said junction, and
(4) a downwardly facing seating surface at said junction, the seating surface extending across, and not exceeding, the width of said frame at said junction, and the frame defining blind bores in the seating surface, (b) a structural unit comprising a rear fork and adjoining said seating surface, the unit having
(1) locating pins, (c) a base plate interposed between said structural unit and said seating surface, said base plate including
(1) a hinge bearing hingedly connecting the structural unit to said baseplate, and
(2) a spring abutment, (d) a backing spring interposed between said spring abutment and said structural unit, the backing spring opposing an upward pivotal movement of said structural unit about said spring bearing, and (e) screws connecting the baseplate to said frame at said seating surface, the locating pins extending from below into the blind bores in the seating surface.

5. The two-wheeled vehicle of claim 4, wherein the structural unit includes a housing extending under said seating surface and defining a space therebetween, and further comprising a bellows covering the space between said housing and said seating surface.

* * * * *